Figure 1:
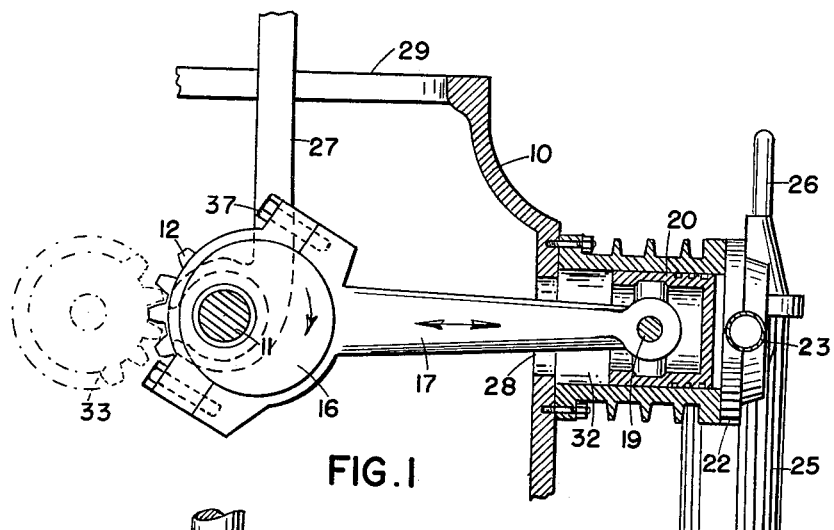

Oct. 24, 1961 W. HAÜSMANN 3,005,354
AUTOMOTIVE AIR COMPRESSOR
Filed Jan. 28, 1960

Werner Hausmann
*INVENTOR.*

BY
Karl F. Ross
AGENT.

3,005,354
AUTOMOTIVE AIR COMPRESSOR
Werner Haüsmann, Uthleben, near Nordhausen, Germany, assignor to VEB Schlepperwerk Nordhausen, Nordhausen, Harz, Germany, a corporation of Germany
Filed Jan. 28, 1960, Ser. No. 5,273
Claims priority, application Germany Feb. 23, 1959
5 Claims. (Cl. 74—44)

My present invention relates to air compressors and, more particularly, to air pumps for the inflation of pneumatic automotive-vehicle tires.

Automotive vehicles, and particularly agricultural tractors and other land-working machinery operated far from service stations, have frequently been provided heretofore with tire-inflating air pumps integral with or auxiliary to the drive of the vehicle. The devices auxiliary to the vehicle drive are adapted to be readily mounted on the power take-off of the vehicle or otherwise linked to the drive either at the engine or via the transmission connected thereto. These air pumps have generally comprised a conventional crankshaft connected to a drive shaft and adapted to convert the rotary motion thereof into an oscillatory motion of the compressor piston within its cylinder. Such compressors required intricate, and consequently expensive, switching arrangements to engage or disengage the compressor crankshaft with or from the vehicle drive shaft, and complex oil-circulating means to insure the lubrication of the piston within the cylinder.

It is an object of the present invention, therefore, to provide an improved and simplified air compressor, particularly adapted for the inflation of tires, whose piston is reciprocated from a vehicle drive shaft directly, i.e. without the intermediary of a compressor crankshaft, and which does not require lubricating means in addition to the oil-circulation system of the vehicle.

Another object of the invention is to provide means for readily switching or shifting an air compressor into and out of engagement with drive means operatively connected to the engine of a vehicle.

According to a feature of the invention, I provide an air compressor whose piston is linked via a piston rod to an eccentric freely rotatable on a transmission shaft which may drive, for example, the power take-off of the vehicle. Advantageously the eccentric may be switched into operative engagement with the shaft via a jaw clutch adapted to couple it with a gear carried thereon upon a relative axial displacement thereof, preferably through the sliding of the eccentric on the shaft together with a transverse displacement of the piston rod by the eccentric.

According to another feature of the invention, the cylinder of the air pump or compressor is secured to the wall of the transmission housing of a vehicle whereby a port provided in that wall communicates with the interior of the cylinder so that the lubricating fluid (e.g. crankcase oil) contained in the housing may wash into the cylinder to lubricate the piston reciprocating therein.

Figure 2:
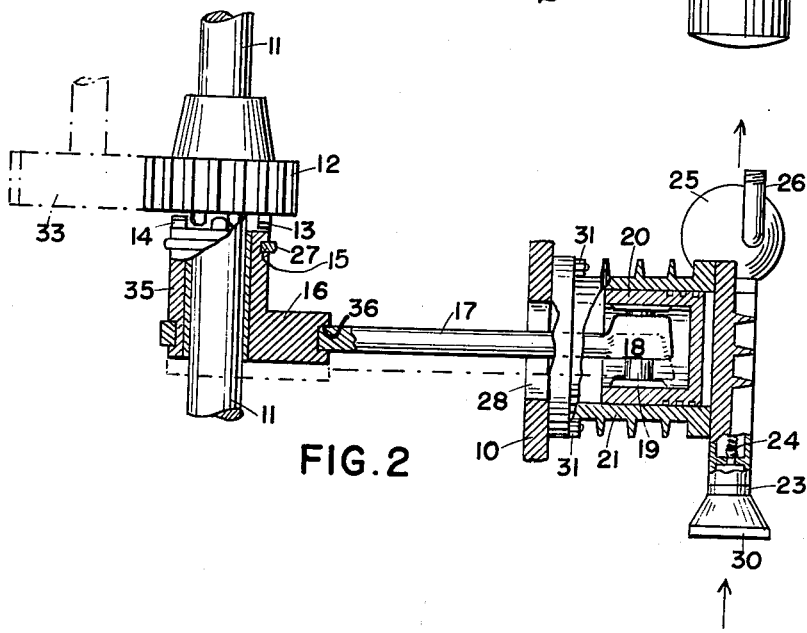

The above and other objects, features and advantages of my present invention will become more readily apparent from the following description, reference being made to the accompanying drawing in which:

FIG. 1 is a front-elevational view, partly in section, of a tire-inflating pump according to the invention; and FIG. 2 is a top-plan view, partly in section, of the pump of FIG. 1.

In the drawing, I show a gear housing 10 through which a drive shaft 11 passes. The shaft 11 carries a spur gear 12 which may be meshed with a gear 33, shown schematically by dot-dash lines, in a transmission, speed-changing, reducing-gear or similar assembly. The shaft 11 carries, in addition, an eccentric 16 freely rotatable and slidable thereon. The eccentric 16 is linked to a piston 20 via a piston rod 17 whose eccentric-engaging end 35 is split and held together by screws 37; this end rides in a peripheral groove 36 of eccentric 16 so as to be transversely entrainable thereby. A pin 19, traversing the piston 20, is rotatably and slidably received in an eye 18 at the other extremity of piston rod 17 to enable a transverse displacement of the latter, parallel to itself, upon an axial shifting of the eccentric. The piston 20 is adapted to reciprocate within the inner bore 32 of a cylinder 21 which is provided on its outer surface with heat-radiating ribs 34 and is secured to a wall of housing 10 by bolts 31 so that its bore 32 communicates with the interior of the housing via a port 28 provided therein, this port accommodating the piston rod 17 for both longitudinal reciprocation and parallel transverse displacement. The cylinder 21 is provided with a conventional cylinder head 22 carrying a pair of valves (one of which is shown at 24) in an air pipe 23 which is provided with an inlet filter 30 and with an oil separator 25 having an outlet 26 for the compressed air.

The spur gear 12 is provided with a jaw-clutch half 13 adapted to engage a mating jaw-clutch half 14 carried on the face of the cylindrical extension 35 of eccentric 16. The cylindrical extension 35 is provided with a circumferential groove 15, adapted to receive a shifting fork 27 which passes through a slot 29 in the roof of the housing 10 facilitating its manipulation. The eye 18, lying entirely on one side of the rod 17, offers sufficient clearance for a unilateral displacement of the rod along pin 19 from its centered position (FIG. 2) which it occupies when the clutch halves 13, 14 are engaged.

In the normal operation of the vehicle, the shaft 11 and the spur gear 12 are in constant rotation and the eccentric 16 is out of engagement with the spur-gear clutch member 13 (dot-dash position in FIG. 2). The eccentric 16 thus runs freely on the rotating shaft 11 while the piston 20 is inoperative and no air is, therefore, delivered at outlet 26. When it is desired to have a supply of compressed air, clutch faces 13 and 14 are brought into engagement by an axial shift of the eccentric 16 and piston rod 17 along shaft 11 and pin 19 to the engaged position shown in FIG. 2 through a suitable displacement of shift lever 27. The eccentric 16 will thus be entrained by spur gear 12 and rotate within the piston rod 17 which in this position is bisected by an axial plane of the cylinder 21 so as to act symmetrically upon the piston 20 as the latter reciprocates within the cylinder. On the leftward (or suction) stroke of the piston 20, air enters the cylinder via valve 24 and filter 30 through pipe 23, while on the rightward (or compression) stroke the valve 24 closes and permits the air to be discharged through pipe 23 and oil separator 25 into an air-storage tank (not shown) from which the compressed air may be conducted by flexible tubes to the tires in a fashion known per se.

The lateral slidability of the unit 16, 17 eliminates the need for major modifications of the transmission 12, 13 such as would be required if, for example, the gear 12 were slidably keyed to shaft 11 for axial displacement thereon into and out of engagement with eccentric 16.

The lubrication fluid normally present in the housing 10 will continuously wash into the interior of the cylinder 21 through the port 28 while the vehicle is in operation, thereby insuring a constant lubrication of piston 20 along its reciprocating path.

The invention admits of many modifications and variations readily discernible to persons skilled in the art and intended to be included within the spirit and scope thereof except as further limited by the accompanying claims.

I claim:
1. In an automotive vehicle, in combination, a trans- mission including a shaft and a gear fixedly mounted on said shaft, an eccentric slidably mounted on said shaft adjacent said gear with freedom of rotation relative thereto, co-operating clutch means on said eccentric and on said gear, a piston rod having an extremity embracing said eccentric for reciprocation upon rotation of the latter, air-compressor means including a piston connected with said rod and a cylinder reciprocably receiving said piston, said rod being positively engaged by said eccentric for displacement in unison therewith in axial direction of said shaft, and control means connected with said eccentric for axially shifting same into and out of an engaged position of said clutch means in which said eccentric is rotated by said shaft and reciprocates said rod.

2. The combination according to claim 1 wherein said eccentric is provided with a peripheral groove, said extremity being split into portions meeting within said groove.

3. The combination according to claim 1 wherein said piston is provided with a transverse pin, said rod having an eye traversed by said pin at a location opposite said extremity.

4. The combination according to claim 3 wherein said eye projects unilaterally from said rod for substantially centering the latter with respect to said piston in said engaged position of said clutch means.

5. The combination according to claim 1 wherein said transmission is surrounded by a housing, said cylinder being externally mounted on a wall of said housing, said wall being provided with a port accommodating said rod with freedom of limited lateral translational movement and enabling the entry of a lubricant from the interior of said housing into said cylinder.

References Cited in the file of this patent

UNITED STATES PATENTS

| | | |
|---|---|---|
| 1,294,325 | Voss | Feb. 11, 1919 |
| 1,483,838 | Schneider et al. | Feb. 12, 1924 |
| 1,896,358 | Gutman | Feb. 7, 1933 |
| 2,053,054 | Voss | Sept. 1, 1936 |
| 2,134,981 | Mikulasek | Nov. 1, 1938 |
| 2,581,241 | Cesaris | Jan. 1, 1952 |
| 2,851,958 | Ballard | Sept. 16, 1958 |